United States Patent [19] [11] 4,153,265
McColl [45] May 8, 1979

[54] OFF-ROAD VEHICLE
[75] Inventor: Bruce J. McColl, Whitby, Canada
[73] Assignee: Owens-Illinois, Inc., Toledo, Ohio
[21] Appl. No.: 842,801
[22] Filed: Oct. 17, 1977

Related U.S. Application Data

[63] Continuation of Ser. No. 584,078, Jun. 5, 1975, abandoned.

[51] Int. Cl.² .................. B60G 19/10; B62D 61/10
[52] U.S. Cl. ..................... 280/112A; 180/22; 180/23; 180/24.13; 280/104; 280/677; 280/682
[58] Field of Search ............ 180/24.01, 22, 23, 24.02, 180/24.03, 24.04, 24.05, 24.08, 24.11, 24.13, 41; 280/104, 111, 112 A, 677, 682, 404, 81 R

[56] References Cited
U.S. PATENT DOCUMENTS

| | | | |
|---|---|---|---|
| 3,183,991 | 5/1965 | Gamaunt | 180/24 |
| 3,198,579 | 8/1965 | Adams | 280/814 X R |
| 3,273,912 | 9/1966 | Crockett | 280/104 |
| 3,450,222 | 6/1969 | Ohlson | 180/51 |
| 3,471,166 | 10/1969 | Clark | 280/677 |

Primary Examiner—Joseph F. Peters, Jr.
Assistant Examiner—Donn McGiehan
Attorney, Agent, or Firm—John R. Nelson; Myron E. Click; Wilson David H.

[57] ABSTRACT

A high-mobility wheeled vehicle for transporting long loads over roadless terrain. The vehicle has front and rear quad wheel assemblies pivotally connected to a centrally disposed elongated bed frame so as to permit lateral rotation of these assemblies about the longitudinal axis of the frame. A roll control means interconnects the quad wheel assemblies and the bed frame to proportionately control the relative angular movement. The wheels of each quad wheel assembly are paired together by walking beam members, thus providing a suspension system having balanced load distribution between the wheels over a wide range of terrain roughness conditions. A differential drive system provides a balanced distribution of power to each wheel on both assemblies under all wheel drive conditions. Preferably, each of these wheels is steerable and the steering control means provides for oblique travel in conjunction with conventional steering.

5 Claims, 18 Drawing Figures

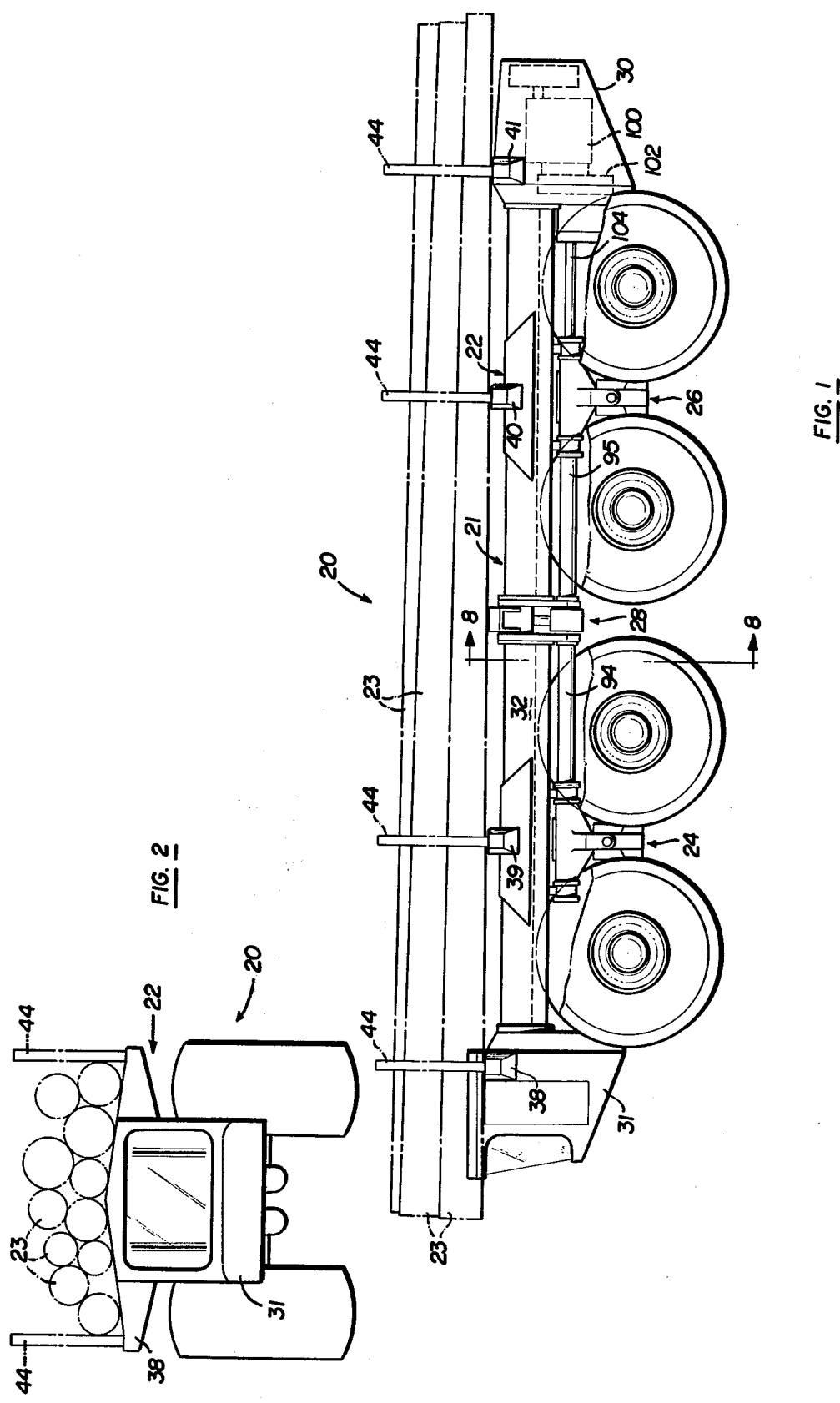

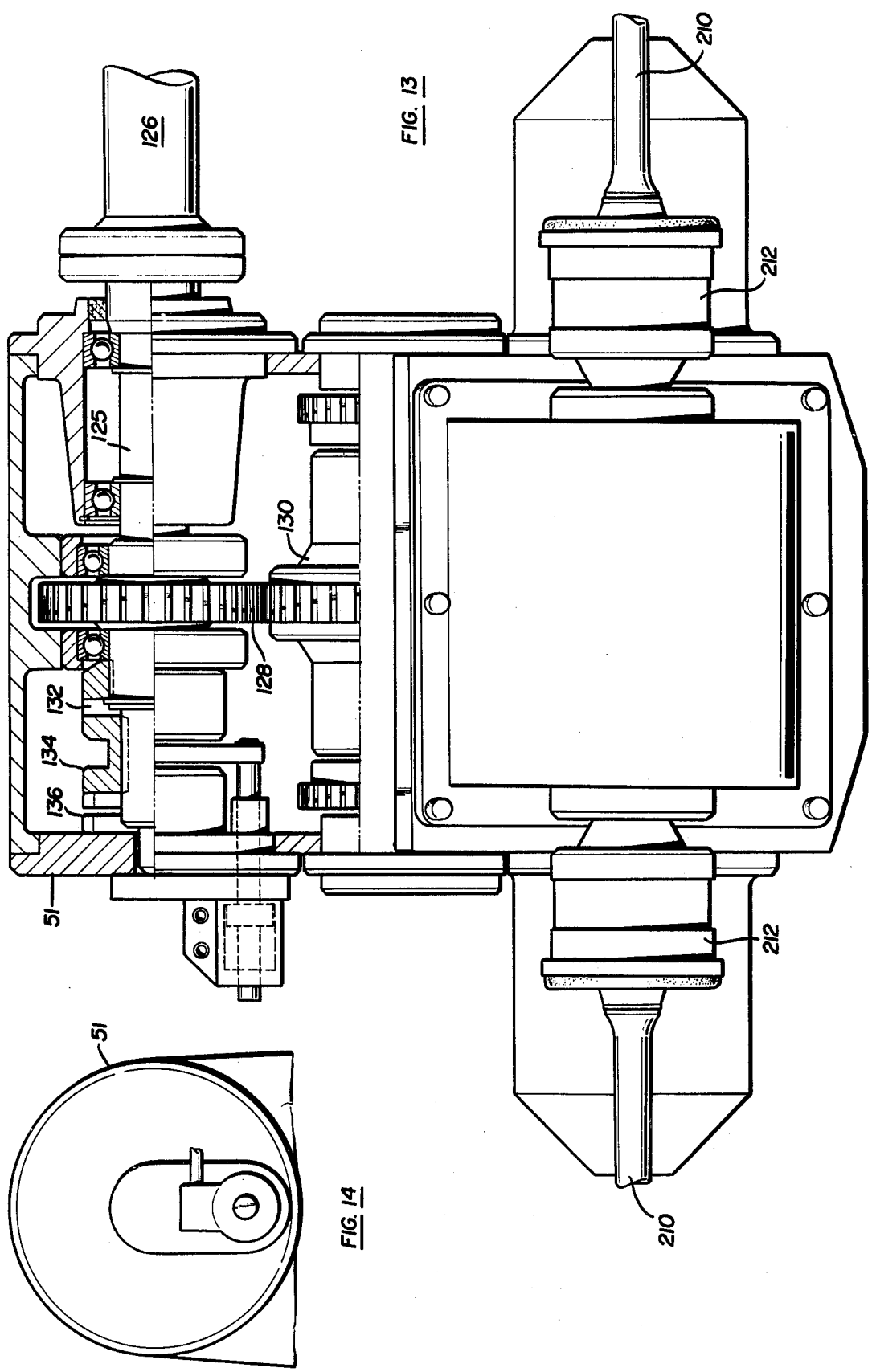

OFF-ROAD VEHICLE

This is a continuation of application Ser. No. 584,078 filed June 5, 1975, abandoned.

SUMMARY OF THE INVENTION

Generally speaking, this invention relates to self-propelled vehicles used primarily to transport long loads across roadless terrain. More specifically, it relates to rubber-tired vehicles that have wheel suspension and drive mechanisms which provide balanced weight and power distribution between its wheels.

In summary, the vehicle comprises an elongated bed frame that forms the backbone of the vehicle. This frame is balanced on the central portions of modular front and rear wheel assemblies, preferably each having four quadrilaterally spaced wheels. The quad wheel suspension system is designed to provide a freedom of movement about roll and pitch axes that are vertically spaced one above the other. The quad wheel assemblies are pivotally mounted on the beam so as to be movable about roll axis which parallels the longitudinal axis of the vehicle. On the lower or pitch axis of each quad wheel assembly two walking beam members, each carrying a pair of side wheels, are rockably mounted in a balanced relationship. Thus the walking beams may rock about the pitch axis of the quad wheel assembly while the quad wheel assembly itself may pivot about the roll axis. A mechanical interconnection that extends from one quad wheel assembly to the frame and from there to the other quad wheel assembly controls the relative rotational position of these members.

The drive train utilizes a series of differentials to divide the power between the two quad wheel assemblies and deliver it equally to each driven wheel. Locking means on these differentials provide an antislip feature for use when one of the driven wheels breaks traction with the ground.

Preferably all of the wheels are steerable and the steering system is designed to provide oblique or sidewise travel as well as conventional turning.

A vehicle equipped with this combination of features has numerous advantages over prior art off-road vehicles, including center frame articulated vehicles and track-laying type vehicles. The advantages become more pronounced when the vehicle is used for transporting long objects, such as trees having a length of 40 feet or more, over soft and broken or uneven ground. When obstacles such as rocks, fallen trees or ditches are encountered by the vehicle of this invention, its wheel suspension maintains substantially equal loading on each wheel. An important advantage of this invention is the efficiency provided by its mechanical drive train. The integrated design and placement of the various drive line and suspension components provide ruggedness and durability commensurate with continuous and severe operating conditions. Extensive use of modular components serves to reduce production and maintenance costs. Another important advantage is that all of these capabilities are incorporated in a vehicle that has a relatively low height and center of gravity. These advantages and other advantages and objects will become more apparent when the following description is read with reference to the accompanying drawings.

BRIEF DESCRIPTION OF DRAWINGS

FIGS. 1, 2 and 3 show a side elevation view, a front view and a plan view respectively of a preferred embodiment of the invented vehicle.

FIG. 13 is a partially sectioned side view of the front wheel assembly transfer case showing interior details of its upper or power input portion and a dog clutch locking the power input shaft to the wall of the transfer case.

FIG. 14 is a front view of the upper portion of the transfer case of FIG. 13 principally showing the exterior portion of the dog clutch.

DETAILED DESCRIPTION OF INVENTION

Figure 3:
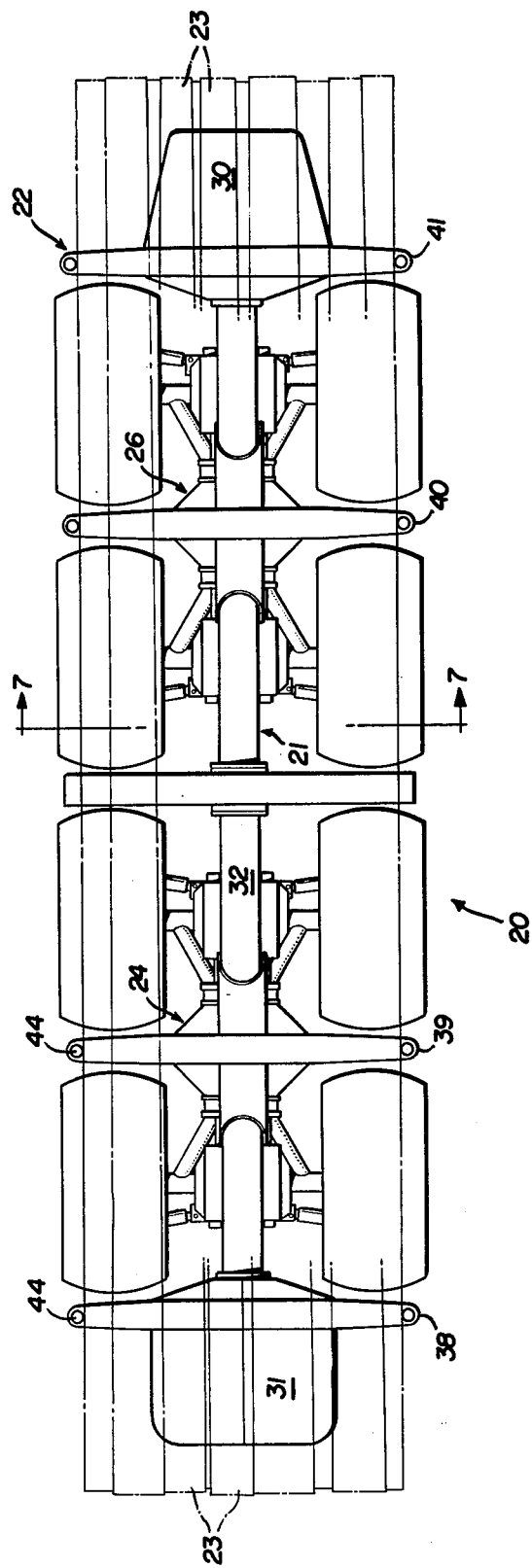
Figure 4:
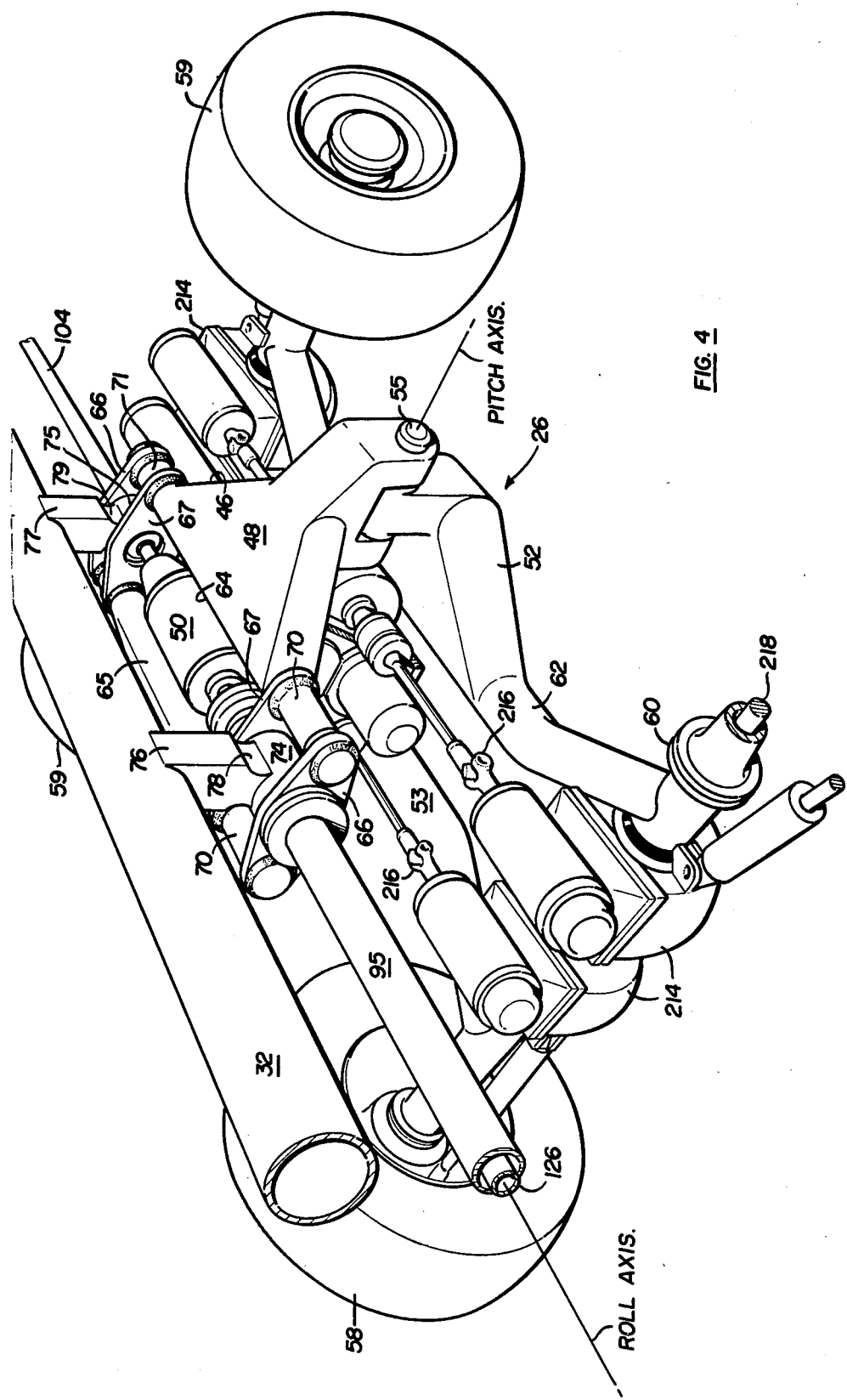
FIG. 4 is a perspective view of the rear section of the vehicle with parts broken away to show the suspension system of the rear quad wheel assembly.
Figure 5:
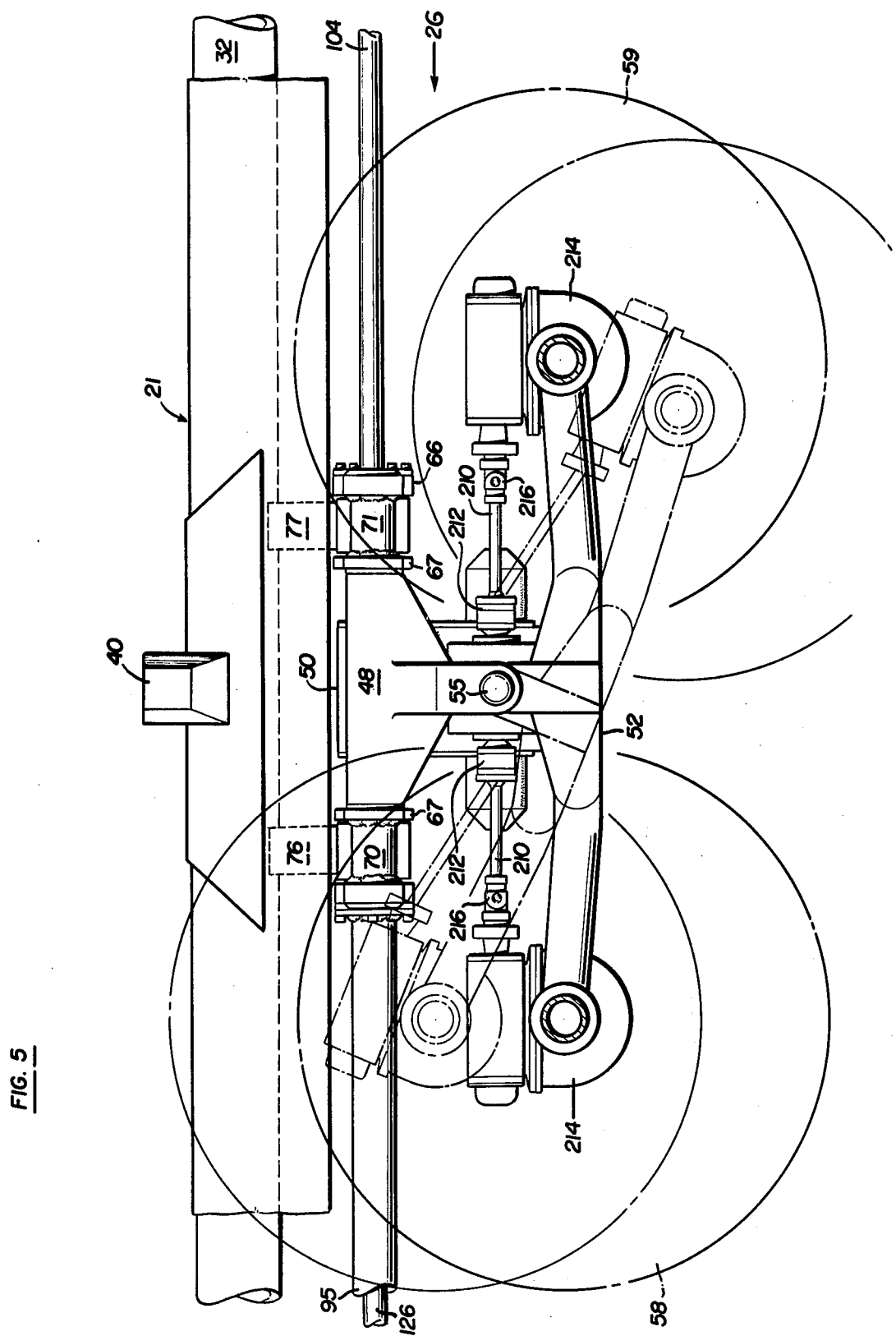
FIG. 5 is a sectional side view of the rear quad wheel assembly taken along lines 5—5 of FIG. 6 showing in phantom lines a walking beam member and its associated drive mechanism in maximum pitch position.

The vehicle illustrated in the drawings is a transportation vehicle such as one used for forwarding tree lengths from a harvesting area in a forest to a landing adjacent to a road. Referring particularly to FIG. 1-3 of the drawings, it will be seen that the vehicle 20 is comprised of bed frame assembly 21 including load-carrying cradle assemblies 22 adapted to carry a plurality of tree lengths 23. Front and rear quad wheel assemblies 24, 26 are attached to the bed frame assembly 21 by journals so as to be pivotally movable laterally with respect to the longitudinal axis of the vehicle. A roll control means 28 interconnects the quad wheel assemblies with each other and with the bed frame assembly so as to control their relative positions during operation. Preferably an engine unit 30 is located at the rear end of the vehicle, and an operator's cab 31 is located at the front end.

The illustrated bed frame assembly 21 comprises an elongated tubular bed frame structure 32 extending lengthwise along the center line of the bed. The bed frame structure 32 which serves as the backbone of the vehicle may be a cylindrical tube made of front and rear sections 34, 36, which are identical or interchangeable. The tubular sections may be bulkheaded, such as at their ends 37, to provide fuel and hydraulic fluid storage tanks (see FIG. 9). A plurality of bed cross beams 38, 39, 40, 41 extends laterally outward from the bed frame structure to form the bases for the load-carrying cradles. Upright side stakes 44 are provided on the outer ends of the cross beams. The stakes, along one or both sides, may be releasably mounted to permit sideways dumping of the load by tilting the bed frame assembly 21.

In the drawings it will be noted that the front and rear quad wheel assemblies 24, 26 are almost identical to one another so, for the sake of brevity, the similar portions will be described with respect to one of them only. Accordingly, attention is directed to FIG. 4–7 of the drawings wherein the details of the rear quad wheel assembly 26 are illustrated. Basically, the element of this assembly can be divided into two functional groups, namely, those that relate to the drive mechanism for supplying power to the four wheels, and those that relate to the suspension system for supporting the bed frame structure centrally between its four wheels.

The wheel suspension system includes a pair of "Y" shaped yoke members 46, 47 having a pair of arms 48, 49 that extend outwardly and downwardly over opposite sides of the power transmission or drive gear transfer case 50. At the lower ends of these arms walking beams 52, 53 are rockably attached by bushings in their midsections to coaxially aligned shafts 55, 56 extending laterally with respect to the roll axis. For ease of description, the common rocking axis of the walking beams will be denoted as the pitch axis. Wheel modules 58, 59 are mounted on respective flanges 60, 61 located on the outer ends of each walking beam. In the preferred embodiment the wheel modules are equipped with low pressure tires, e.g., 5–10 pounds per square inch and the wheel modules are mounted such that a straight line between the pair of wheel axes of a walking beam runs beneath its pitch axis. Intermediate portions 62, 63 lying between the ends and midsection of each walking beam are recessed inwardly, giving the walking beams a generally "W" shape in the plan view. This provides steerage clearance between the tires and the walking beams. In the illustrated embodiment, the clearance is sufficient to provide for turning 30° to either side from straight forward.

The upper or shoulder portions 64, 65 of the yoke members 46, 47, are rigidly joined together by two pairs of generally diamond-shaped flange plates 66, 67, thus forming a rigid frame with a central aperture. One method of joining the shoulder sections together is to form coaxially aligned right cylinder sections 70, 71 along the top of the shoulders, insert the cylindrical sections in holes bored in the corresponding pairs of flange plates and weld the cylindrical sections to the flange plates. The rectangular opening in the rigid frame between the shoulders 64, 65, and plates 67 allows the top of the transfer case 50 to protrude through the opening a distance that is sufficient to permit alignment of the top shaft axis in the transfer case with the drive line axis and the centers of the flange plates. Each pair of flange plates has a hollow bearing shaft insert 72 which spans the space between the centers of the plates, thus forming a roll axis journal. Two of these journals are provided for each quad wheel assembly, and they are positioned so as to longitudinally straddle the center of the transfer case. A corresponding number of bearing members 74, 75 are affixed to the underside of the bed frame beam by means of pillars 76, 77. With this structural arrangement, the rotational axis of the quad wheel assemblies is parallel to the longitudinal axis of the bed frame beam and is located directly beneath it. Alternatively, the rotational axis of the quad wheel assemblies could be made coincident with the bed frame structure axis by providing bearing means in the top portions of the suspension structure gear cases and using cylindrical portions of the bed frame structure as journals. In such an alternative embodiment, the drive line may be located below the roll axis. Abutment means 78, 79 on pillars 76, 77 are provided to limit the extent of angular movement of each quad wheel assembly about its roll axis.

Figure 6:
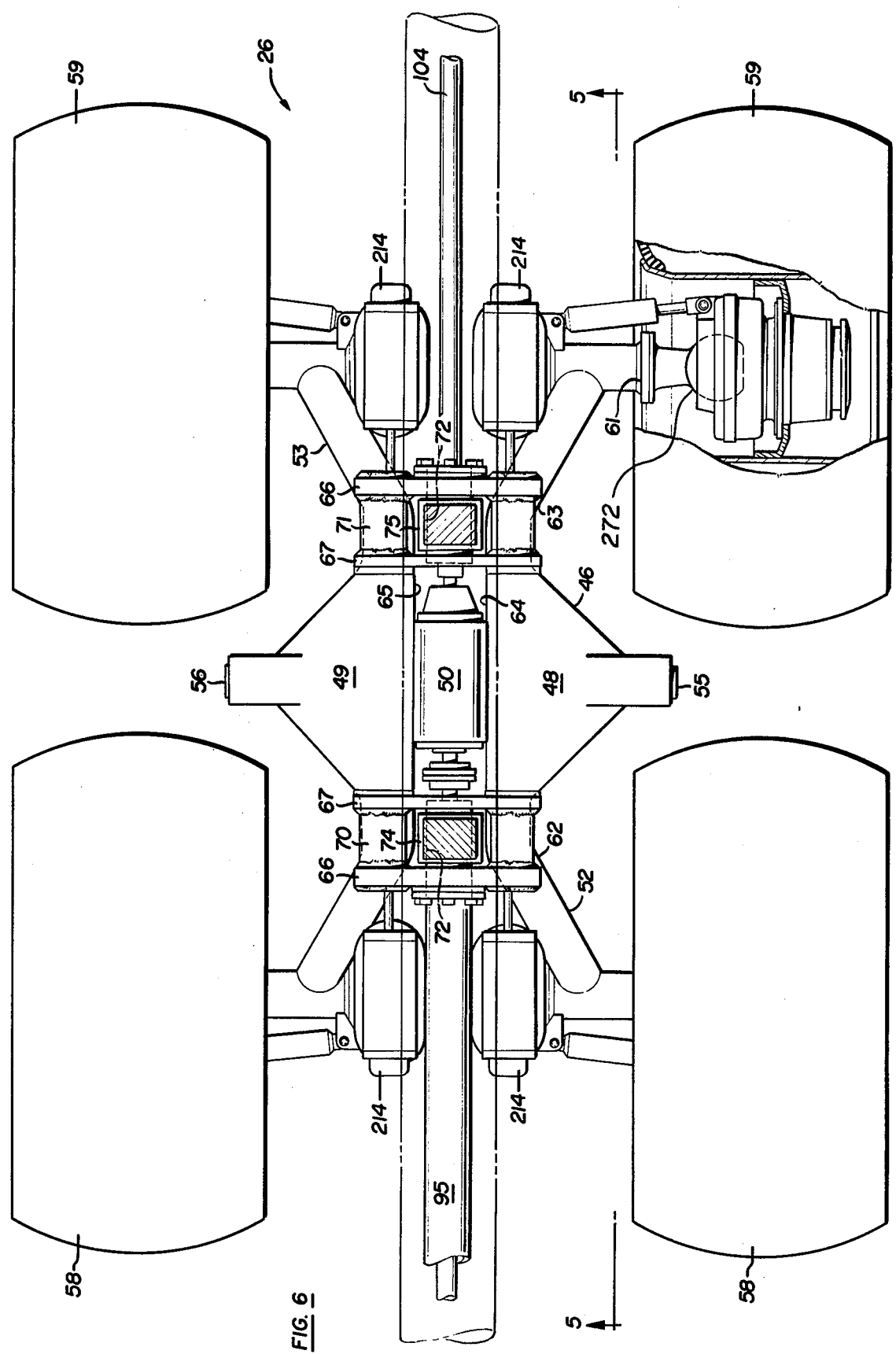
FIG. 6 is a sectional plan view taken along lines 6—6 of the rear quad wheel assembly shown in FIG. 7.
Figure 7:
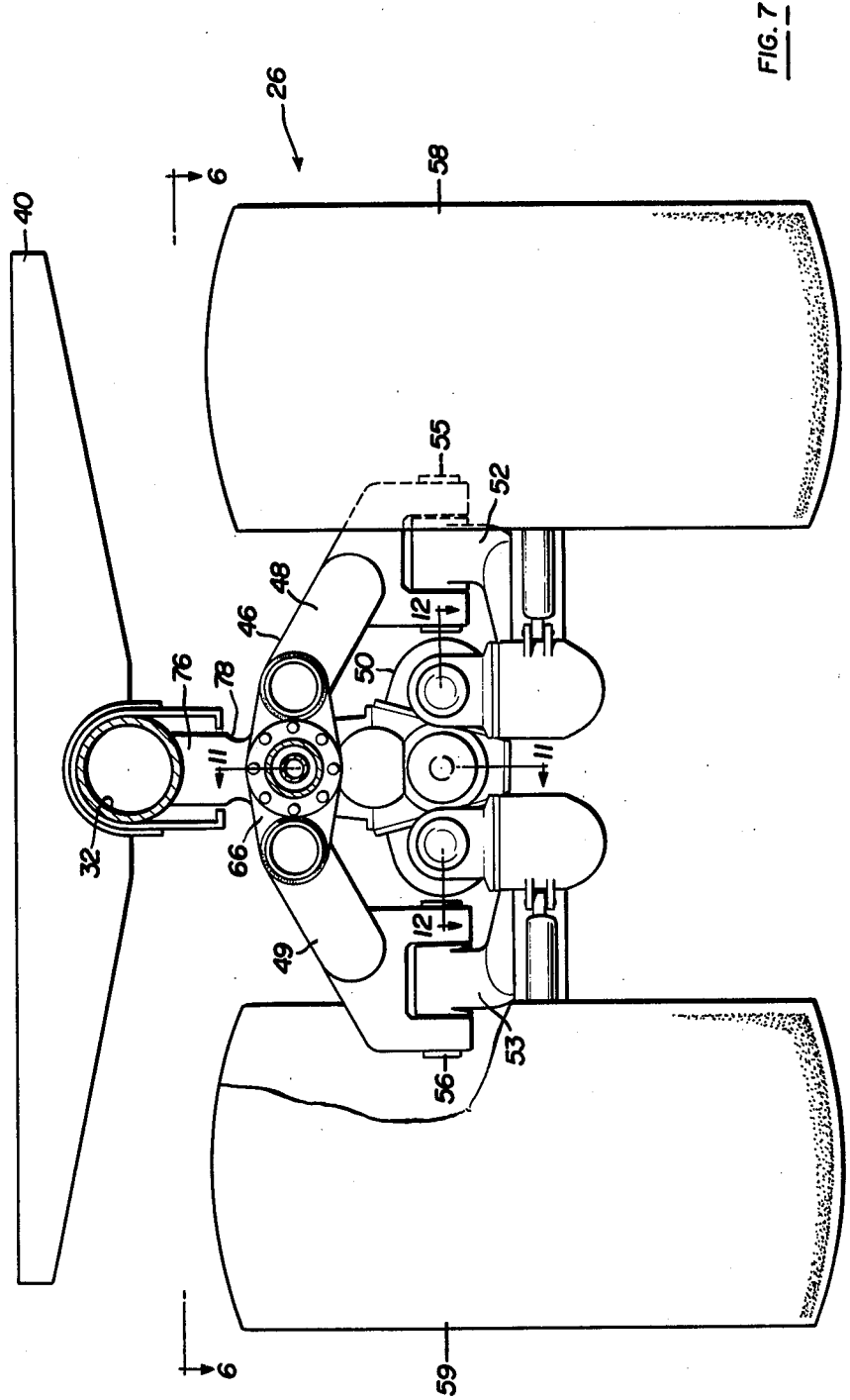
FIG. 7 is an enlarged sectional view taken along lines 7—7 of FIG. 3.
Figure 9:
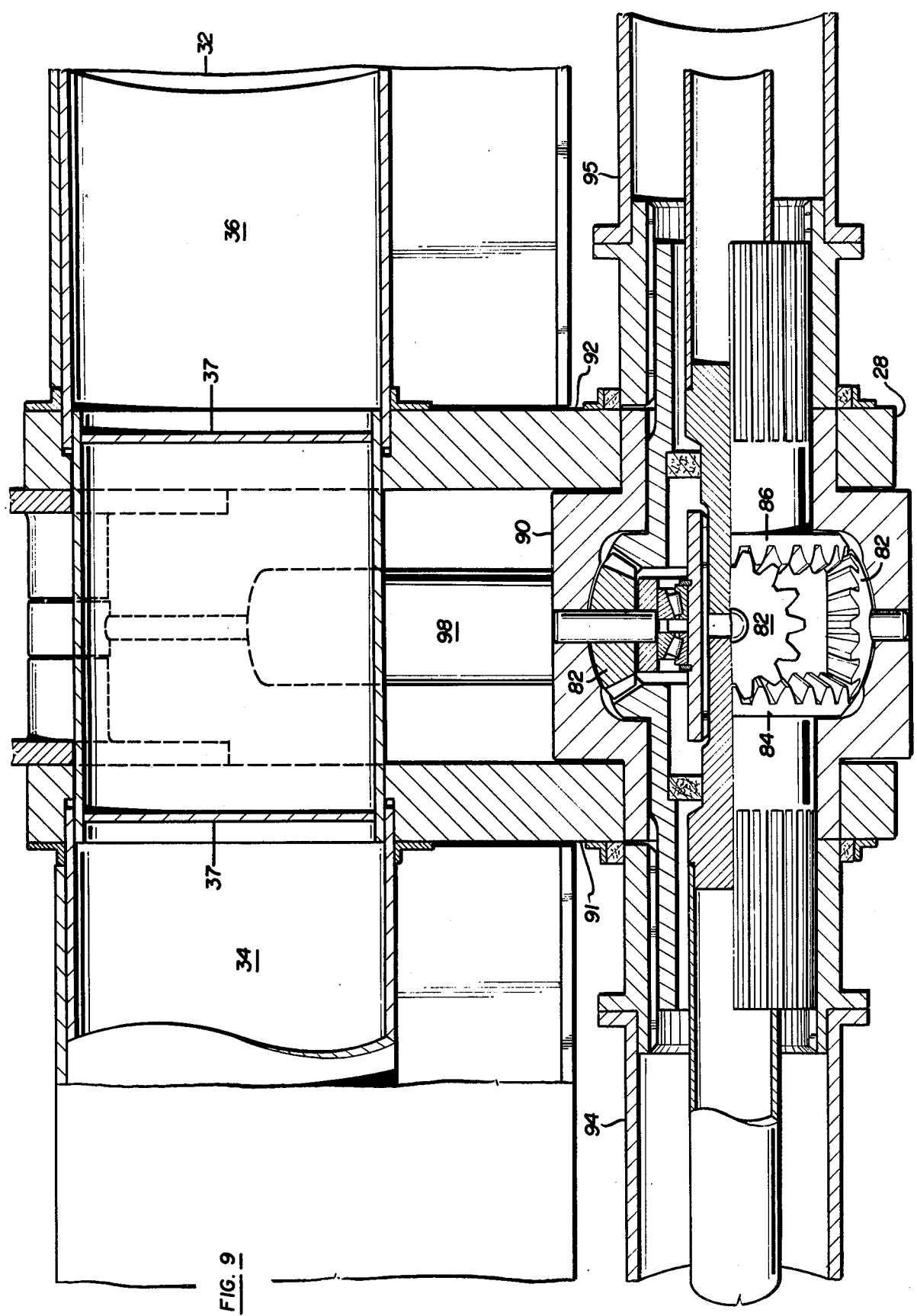
FIG. 9 is an enlarged sectional view taken along lines 9—9 of FIG. 8 with parts broken away, primarily showing interior details of the roll control mechanism.
Figure 10:
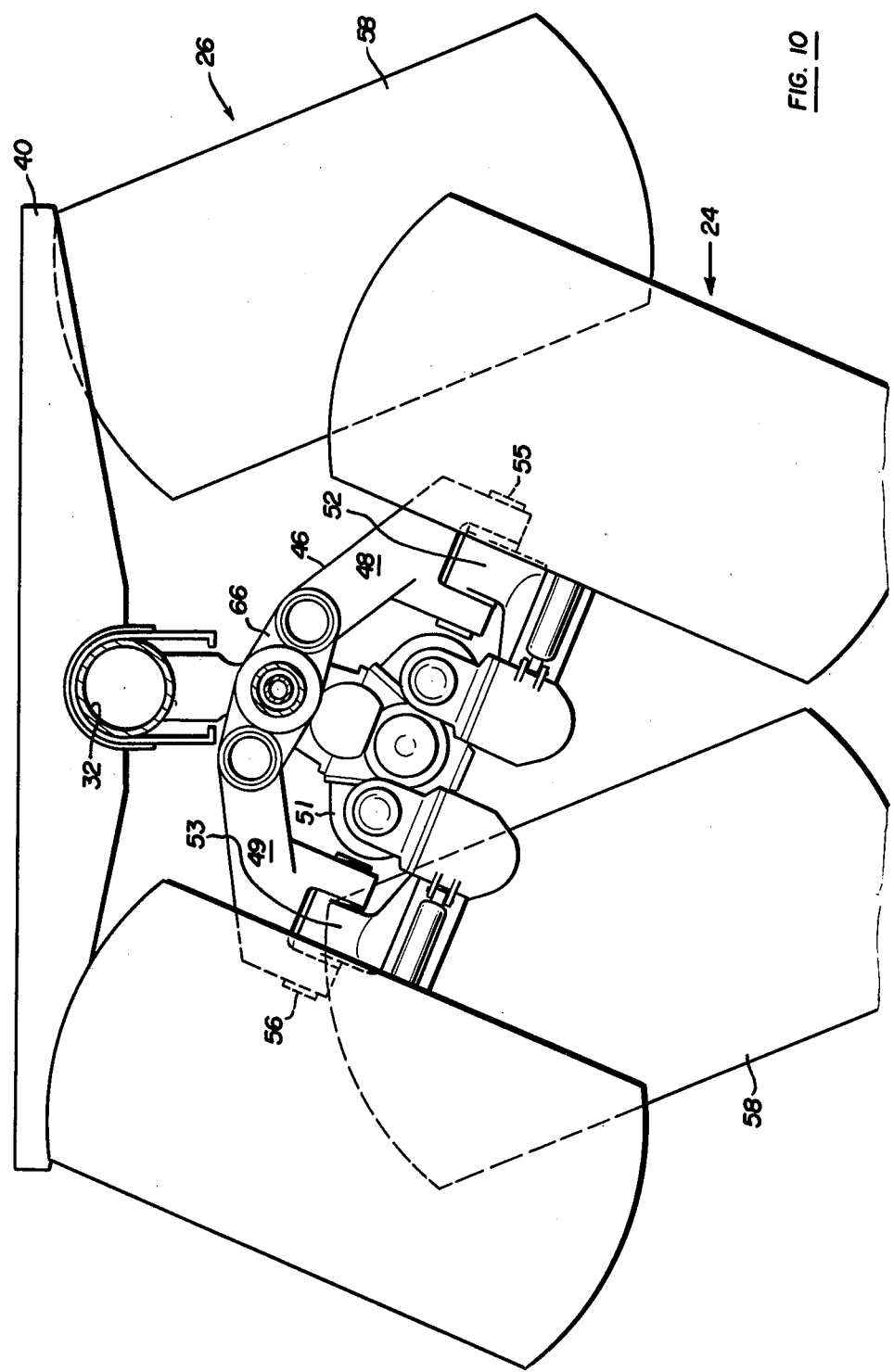
FIG. 10 is a sectional view similar to that of FIG. 7 but showing the wheels of the front and rear wheel assemblies in maximum roll positions.

The relative angular movement of the quad wheel assemblies with respect to each other and to the bed frame assembly 21 is regulated by the roll control means 28 that causes the bed frame assembly to be rotated proportionately, preferably one-half of the total angular displacement between the front and rear quad wheel assemblies. Angular displacement between the quad wheel assemblies occurs during operation on uneven terrain where the ground under the front quad wheel assembly is laterally and oppositely inclined to the ground under the rear quad wheel assembly, such as might occur while the vehicle is traversing a ditch at an angle. The roll control means illustrated in FIG. 9 is a bevel gear differential assembly comprising pinion gears 82, side gears 84, 86 and housing 90. This differential assembly is mounted below the bed frame structure 32 by means of brackets 91, 92 and is rotatable therein but is normally held in a fixed rotational position with respect to the bed frame assembly. The side gears 84, 86 are splined on adjacent ends of torque tube members 94, 95, which extend in opposite directions respectively to the front and rear quad wheel assemblies where their remote ends are bolted to the flange plates 66 of the suspension yokes, for example, see the remote end of tube 95 (FIG. 6).

Accordingly, any relative sidewise tilting or rolling of a quad wheel assembly will cause its torque tube member and side gear to be rotated, thereby rotating the pinion gears which in turn cause the opposite side gear, its torque tube and quad wheel assembly to be subjected to a rotational force in the opposite direction and, since the other wheel assembly is in engagement with the ground and cannot move, the end result is that the annular carrier for the pinion gears, hence the bed frame, is rotated about the roll axis an amount proportional to the gear ratio, hence causing a relative rotation of the other quad assembly with respect to the bed frame structure. One of the advantages of a vehicle equipped with the above-described suspension and roll control means is that when a wheel is deflected upwards by a sidewise rolling of a wheel assembly, there is a proportionate upward displacement of the corresponding side of the platform assembly. Thus for the same maximum roll, a vehicle so equipped may be slung 50 per cent closer to the top of the wheels than a vehicle not so equipped.

Figure 8:
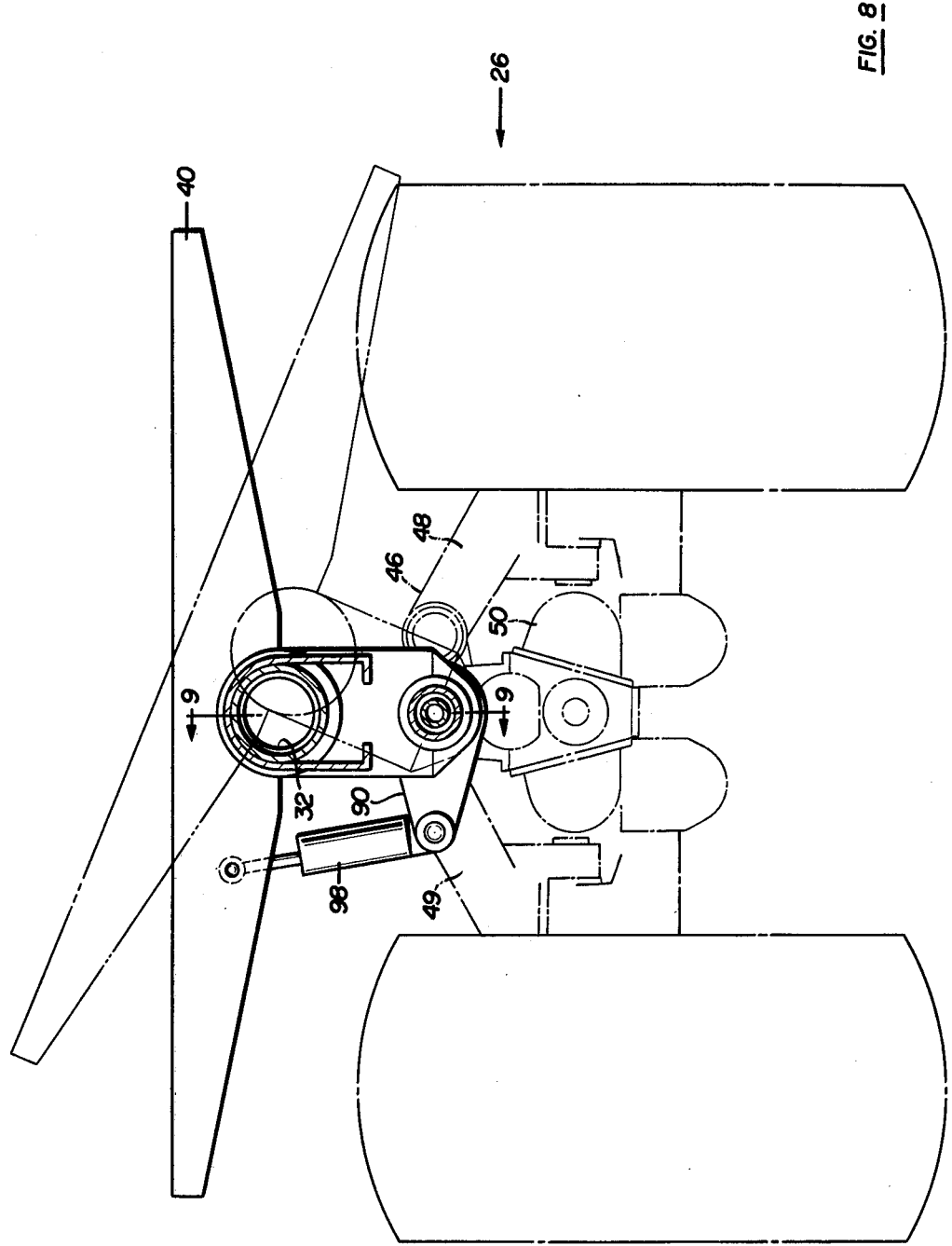
FIG. 8 is an enlarged sectional view taken along lines 8—8 of FIG. 1 showing details of the platform dumping and tilting mechanism.

Referring to FIG. 8, preferably the differential assembly housing 90 is adjustably locked to the crossbeam 40 of frame assembly 21 by a hydraulic cylinder and a piston means 98 in such a manner as to permit the steady state level of the bed frame assembly to be selectively changed. For example, the bed frame assembly could be adjusted to a level position, if desired, when the vehicle is being operated on the side of an incline. The hydraulic and piston means may also be used to tilt the bed frame assembly to an extreme angular position, as is shown in phantom lines on the drawing for dumping a load.

The vehicle drive train begins with an engine 100 which is preferably mounted on the rear end of the bed frame structure 32 (see FIG. 1). A multispeed transmission 102 having forward, neutral and reverse positions is provided to transmit power from the engine through the main drive shaft 104, extending beneath the bed frame structure to the input member 106 of the rear transfer case 50 (see FIG. 11), thence forwardly by means of succeeding drive shafting to the front transfer case 51. Preferably, the axes of the input member 106 and all succeeding drive shafts forward of it are coincident with the roll axis and are maintained in alignment with each other. In the illustrated embodiment these succeeding drive shafts are rotatably and concentrically supported within the torque tube members.

Figure 11:
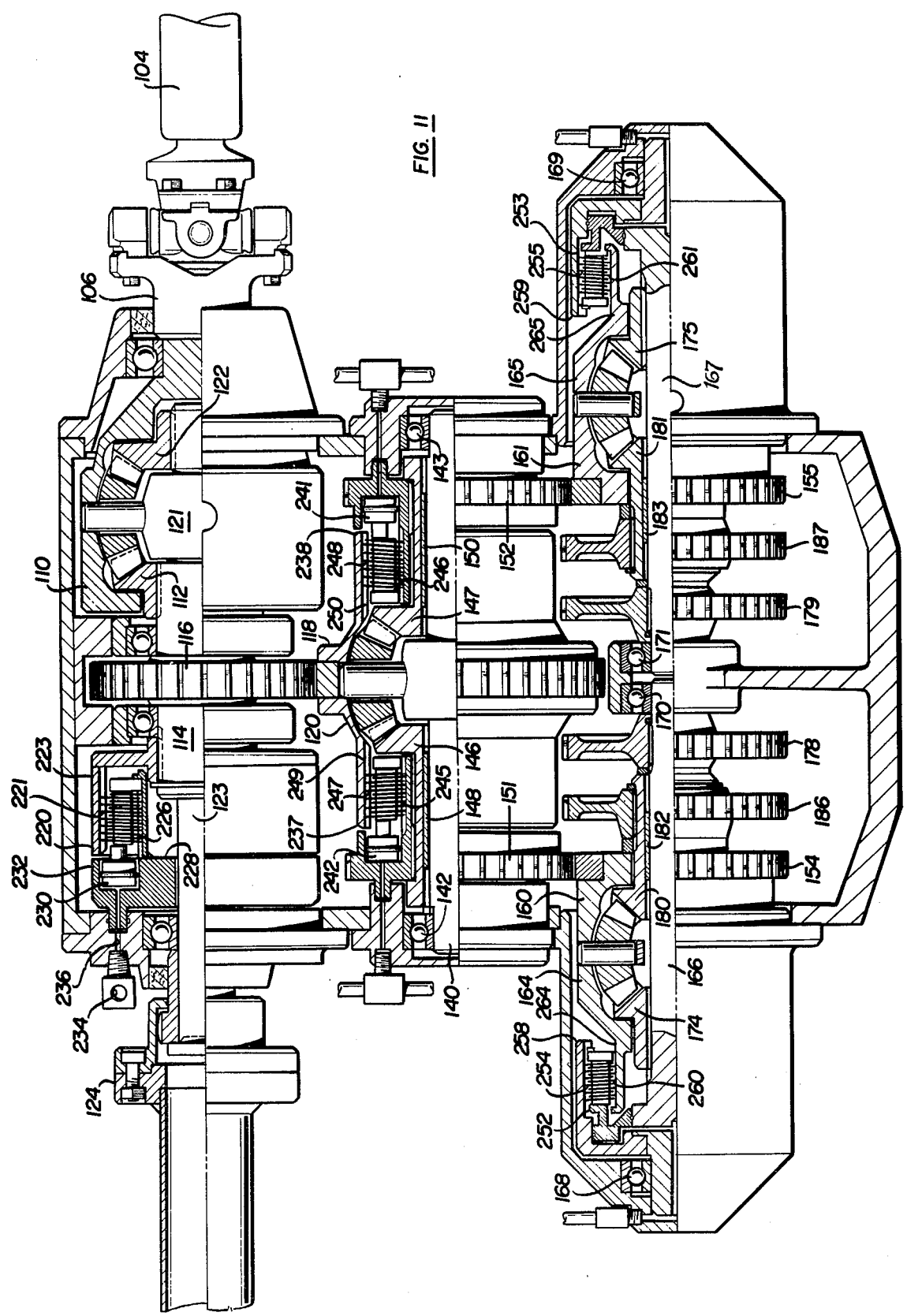
FIG. 11 is a relatively larger scale, partially sectioned side view of the rear wheel assembly transfer case taken along lines 11—11 of FIG. 7.

One end of the input member 106 for the rear transfer case 50 is flexibly coupled to the main drive shaft 104 and the other end is integrally connected to the housing 110 of an interquad wheel differential assembly gear mechanism (see FIG. 11). The side gear 112 towards the front of the differential is splined on a forwardly extending tubular shaft 114 which carries the primary input gear 116 for driving the housing 118 of a first-stage differential 120 of the rear transfer case. The other side gear 122 is splined on a countershaft 123 that extends forwardly through the hollow spider 121 of the differential gear assembly housing 110 and then through the center of tubular shaft 114 to a shaft coupling 124 outside the transfer case 50.

The input shaft 125 (FIG. 13) for the front transfer case takes its power from an intermediate drive shaft 126 coupled between it and the aforementioned countershaft 123. The center portion of this input shaft 125 carries a drive gear 128 for driving the housing 130 of a first-stage differential of the front transfer case. This drive gear is rotatably mounted on the input shaft and has a dog clutch face 132 on its forward end for selective engagement with a shiftable dog clutch member 134 splined on the forward end of the input shaft. On the opposite side of the shiftable member 134 is a second dog clutch face 136 affixed to the interior wall of the transfer case.

During off-road use when the tractive effort of both quad wheel assemblies is required, the shiftable clutch member is positioned in engagement with the clutch face 132 on the drive gear of the front transfer case, thus locking the input shaft and drive gear together. In this position the drive train supplies power equally to both transfer cases through the interquad wheel differential in the rear transfer case. When the vehicle is being operated on a road surface and the tractive effort of the front wheel assembly is not required and increased speed becomes important, the shiftable clutch member may be positioned into engagement with the clutch face 136 on the transfer case wall. This locks the input shaft 125 against rotation along with all of the preceding drive line components back to and including the side gear 122 of the interquad wheel differential. Locking the one side gear 122 of the differential causes the other side gear 112 and the components driven by it to be rotated at twice their normal speed, thus providing a convenient means for doubling the vehicle's highway speed. When the drive train has been shifted into this latter state, the front quad wheel drive is released and becomes free-wheeling.

Considering the individual wheel drives of each quad wheel assembly and beginning with the first stage differential 120, the succeeding elements of both the front and rear transfer case drives are identical and will be described primarily with reference to the rear gear transfer case 50 shown in FIG. 11. In brief, the first stage differential drives a pair of second stage differentials which in turn drive two wheels each to provide balanced power distribution to the four wheels of the quad wheel assembly. The differential housing 118 of the first stage differential 120 is mounted on a master shaft 140 which has its ends supported on bearings 142, 143 located in opposite ends of the transfer case. Its side or output gears 146, 147 are mounted respectively on coaxial tubular shafts 148, 150 which are, in turn, rotatably supported concentrically on the master shaft 140. Drive gears 151, 152 affixed to the side gear shafts mesh with driven gears 154, 155 affixed respectively around the differential housings 160, 161 of a pair of second stage differentials 164, 165. These differential housings are coaxially and rotatably mounted on aligned secondary master shafts 166, 167 which extend inwardly from bearings 168, 169 on opposite sides of the transfer case to centrally located bearings 170, 171 supported by a rib section 172 on the vertical center line of the transfer case. The second stage differential 164 at the front end of the transfer case 50 on the left side of FIG. 11 distributes power to the two front wheels of the quad wheel assembly, while the second stage differential 165 at the rear end of the transfer case distributes power to the two rear wheels thereof. For ease of description, the drive components related to the forward differential 164 have been given even reference numbers and those related to the rearward differential 165 have been given odd reference numbers. The side gears 174, 175 on the outer sides of the two differentials 164, 165 are splined on the outer ends of the secondary master shafts 166, 167. Splined on the inner ends of these shafts are corresponding spur gears 178, 179. Between the side spur gears on each shaft 166, 167 are the other or inner side gears 180, 181 of the two differentials. These inner side gears 180, 181 have inwardly extending hub sections 182, 183 which are concentrically and rotatably mounted on their respective shafts 166, 167 and have spur gears 186, 187 splined on their innermost ends.

Figure 12:
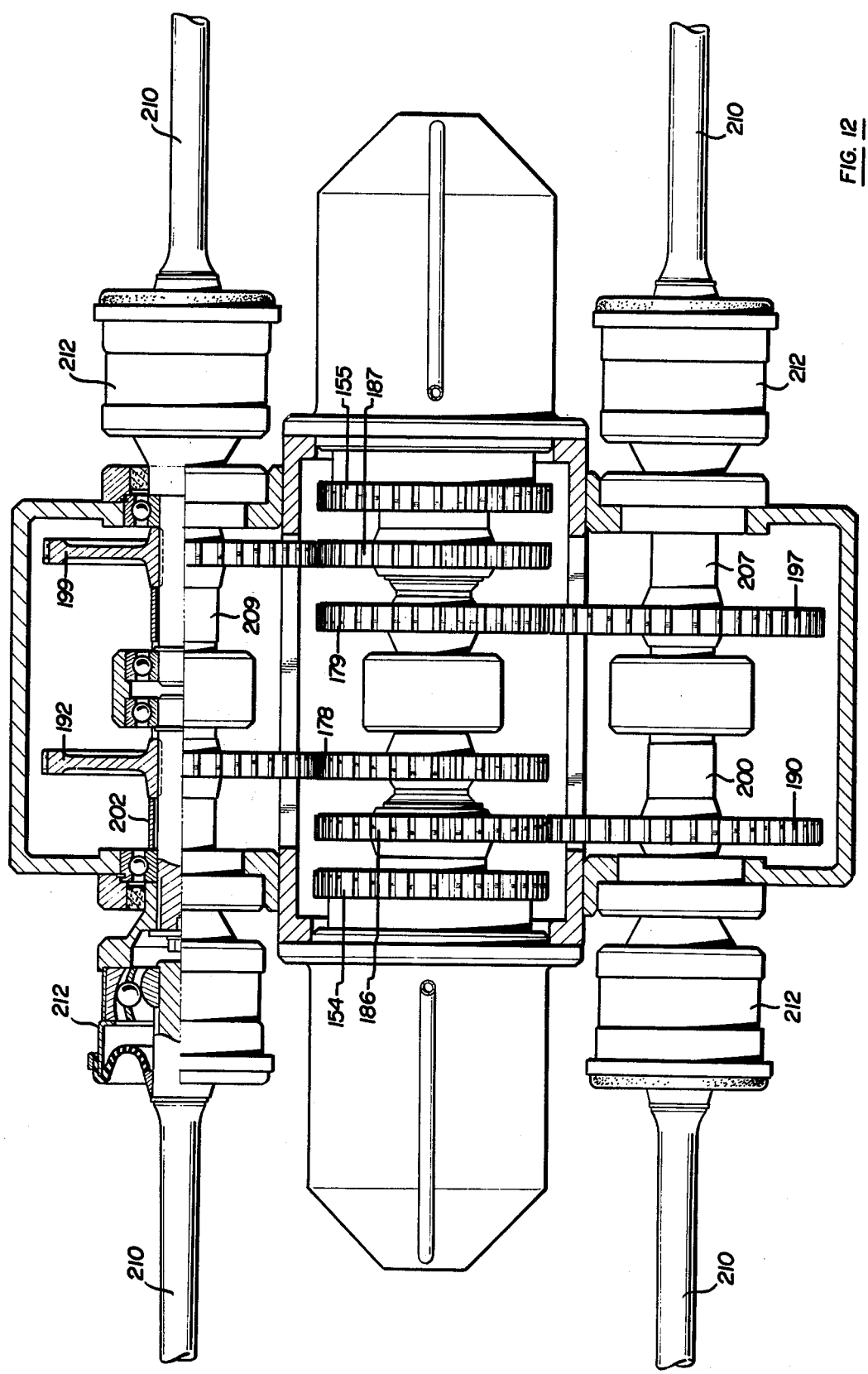
FIG. 12 is a partially sectioned plan view of the transfer case taken along lines 12—12 of FIG. 7.
Figure 15:
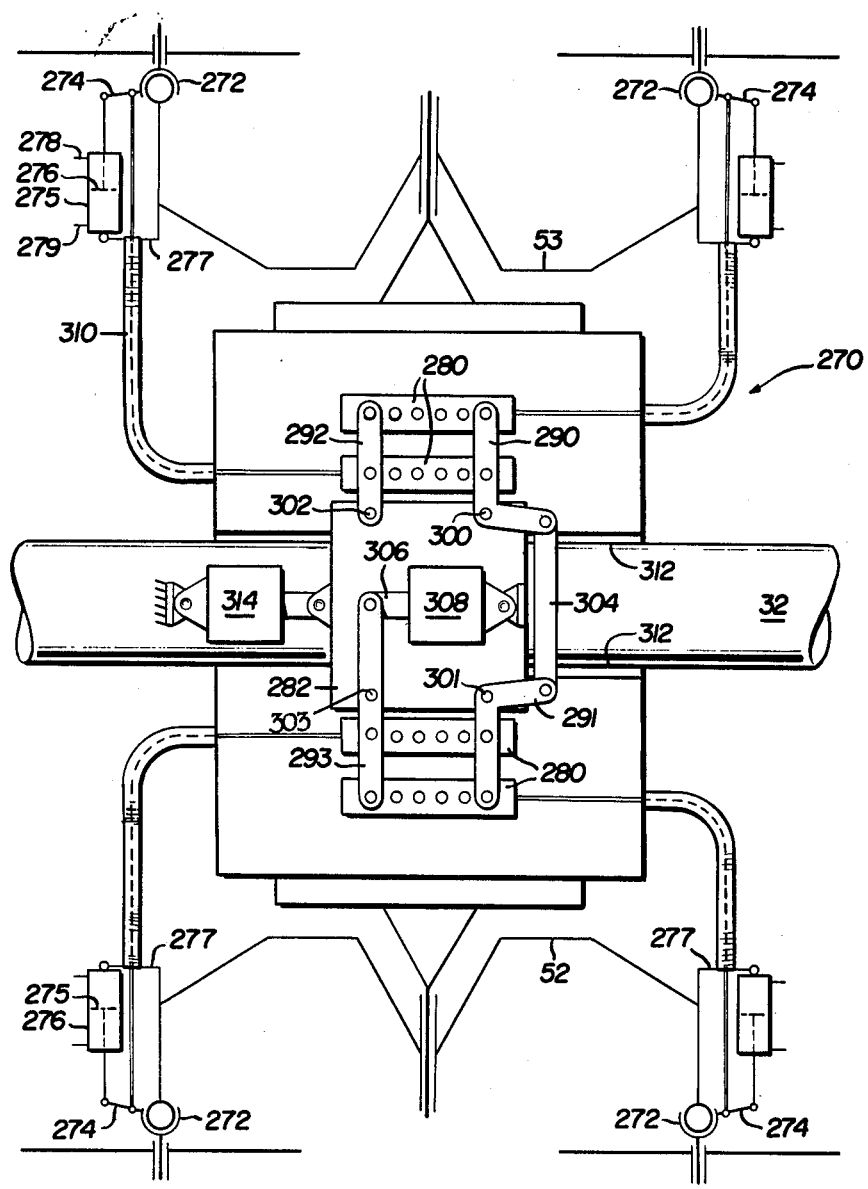
FIG. 15 is a partially schematic plan view of the mechanical portion of the steering subsystem for the rear quad wheel assembly with the mode control in the conventional steering position and the wheels in a straightforward position.
Figure 16:
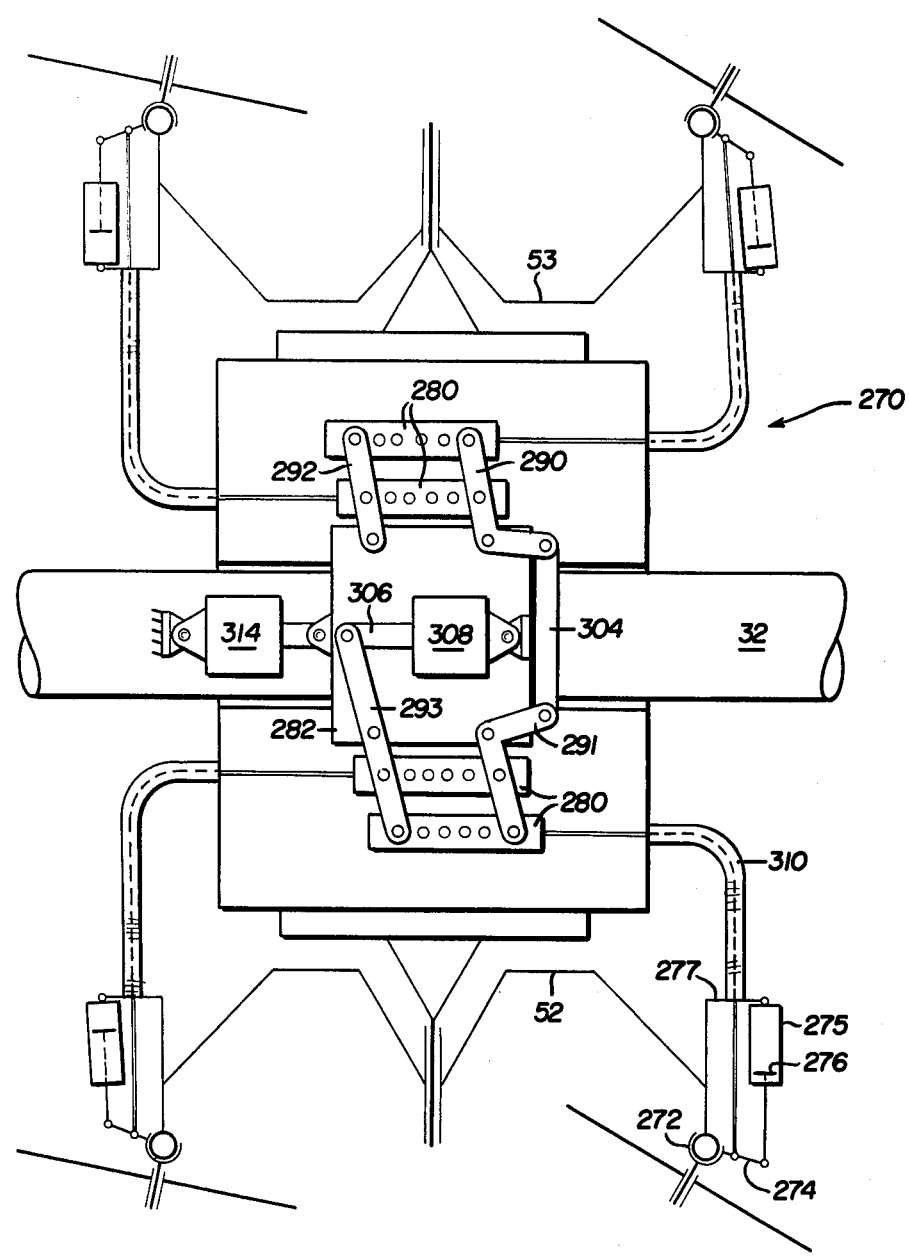
FIG. 16 is a view similar to FIG. 15 but with the steering components and wheels in a left-turn position.

As is best shown in FIG. 12, the two even-numbered gears 186, 178 driven by the second stage differential 164, in the forward half of the transfer case, drive spur gears 190, 192, respectively, for the left and right front wheels of the quad wheel assembly. Similarly, the two odd-numbered gears 179, 187 driven by the second stage differential 165, located in the rearward half of the transfer case, drive spur gears 197, 199, respectively, for the left and right rear wheels. These last four gears 190, 192, 197, 199 of the gear train are affixed respectively to rotatable output shafts 200, 202, 207, 209 within the transfer case.

Each of the four output shafts is flexibly connected to an exterior drive shaft 210 by means of a constant velocity joint 212. A right angle drive mechanism 214 is connected to the outer end of each exterior drive shaft by means of a splined universal joint 216 (see FIGS. 4 and 5). Each wheel is driven by a shaft 218 extending laterally from the right angle drive. Accordingly, balanced driving power is supplied to each of the four wheels of both the front and rear quad wheel assemblies.

An antislip or positive drive means is provided to lock all differentials when the traction conditions between the wheels and the ground are such that one of the wheels breaks traction and begins to spin relatively freely. This positive drive means includes a series of hydraulically operated clutches which lock at least two of the three elements of each differential to each other, thus eliminating relative rotation between the output shafts of the differentials. Basically, each clutch comprises a series of annular clutch disks with half of the disks splined on one differential member and alternate disks splined on another differential member. In a free running position, these clutch disks are spaced apart slightly subject to being forced into firm non-slipping contact with each other by a hydraulically operated annular piston. The clutch 220 in the upper left part of the transfer case in FIG. 11 is capable of locking together the two output shafts 114, 123 of the interquad wheel differential that supply power respectively to the rear and front quad wheel assemblies. Alternate clutch disks 221 are splined on a drum 223 which is, in turn, splined to the shaft 114 that drives the input gear 116 of the rear transfer case. The other half of the clutch disks 226 are splined to an interior drum 228 affixed to the output shaft 123 that transmits power to the front quad wheel assembly input gear. An annular piston 230 is contained in an annular cylinder 232 in the face portion of the interior drum 228. An activating hydraulic system line 234 communicates with the cylinder via an aperture 236 in the wall of the transfer case.

The first stage differential 123 is supplied with dual clutches 237, 238 of similar construction which serve to lock both of the output shafts 148, 150 to the differential housing 118. Functionally, only one clutch is needed to achieve a lockup, but two clutches are provided here to balance the dynamic loads and provide increased clutch capacity. Annular hydraulic pistons 241, 242 are contained in annular cylinders on the sides of the input gears 151, 152 which drive the differential housings 160, 161 of the second stage differentials 164, 165. Alternate clutch disks 245, 246 are splined on each of the hubs of these input gears, while the remaining half of the clutch disks 247, 248 are splined on the internal surfaces of drum section 249, 250 extending outwardly from the sides of the differential housing 118.

Each of the second stage differentials has a clutch 252 or 253 wherein the alternate clutch disks 254 or 255 are respectively splined on the inner surface of a drum member 258 or 259 affixed to the master shaft 166 or 167. The other half of the clutch disks 260 or 261 are splined on an outer surface of a drum member 264 or 265 integrally connected to the differential housing 164 or 165. All of the clutches are activated simultaneously by the same hydraulic system.

The steering system illustrated in part in FIGS. 15-18 provides an added degree of maneuverability to the vehicle and thus enhances its utility. Basically, the illustrated steering system has at least two operational modes, one being a conventional Ackerman steering mode and another being an oblique travel mode. Since the component parts and functional features are substantially the same for the front and rear quad wheel assemblies, a complete understanding of the steering system can be gained from a detailed description of only one subsystem, namely, the subsystem 270 for the rear quad wheel assembly 26.

Each of the four wheels of the rear quad wheel assembly 26 is steerably connected to its respective walking beam 52, 53 end by means of a knuckle joint 272 designed for driven wheels (see FIG. 6). Rigidly affixed to each wheel adjacent to the knuckle joint is a steering arm 274 (see FIGS. 15-18). A linear actuator, such as a hydraulic cylinder 275 and piston 276, is connected to the steering arm 274 and to an adjacent portion 277 of the wheel suspension system so that relative movement of the piston in either direction from a center or neutral position causes a corresponding turning movement of the wheel to the right or left. Flexible hydraulic lines 278, 279 run from opposite ends of each cylinder 275 to centrally located control valves 280 carried by a shiftable mode control plate 282. Preferably, the control valves 280 are closed center, three-position, four-way, center biased valves connected to the pressure manifold 286 by pressure line 284, and to the reservoir by return line 285 of a central hydraulic accumulator system (see FIG. 18). The valves are carried in parallel pairs along opposite sides of a plate 282 by means of four parallelogram lever arms 290, 291, 292, 293, which are pivotally connected by respective pintles 300, 301, 302, 303 located adjacent to the four corners of the plate 282. The two lever arms 290, 291 near the rear end of the plate are bell crank levers that have the free ends of adjacent legs connected together by a tie rod 304. The other legs of these bell crank levers 290, 291 extend laterally from respective sides of the mode control plate 282. Each of these lateral legs carries the rearward ends of the bodies of two oppositely disposed control valves 280 attached thereto by means of pivot pins. The forward ends of the valve bodies are likewise pinned to their respective lever arms 292, 293 located at the forward end of the mode control plate 282. A parallelogram is formed on each side of the plate by the valve bodies and their connected lever arm sections.

The outer valves of both pairs of valves are spaced a greater distance from the lever pintles than the inner valves. As a result, the outer valves move a greater distance than the inner valves when the levers are pivoted about their pintle axes. This causes the wheels controlled by the outer valves to be turned more than the wheels controlled by the innermost valves. The outer valves of the rear quad wheel assembly control the rear pair of wheels, whereas the outer valves of the front quad wheel assembly control the front pair of wheels, leaving the remaining two pair of wheels to be controlled by the innermost valves of each subsystem. Preferably the relative spacing between outer and inner valves and the distance from the innermost valves to their pintles in the subsystem are selected so that Ackerman steering is achieved, i.e., throughout the turning range the plane of each wheel remains substantially perpendicular to its respective radius line drawn from a common point located along a line that is perpendicular to the longitudinal axis of the vehicle and through the center of the vehicle. In the illustrated vehicle the maximum turning angle for the pairs of wheels at the front and rear ends of the vehicle is approximately 24°-30° and for the two centrally located pairs of wheels is about 9°-11° (see FIG. 16).

One of the lever arms at the forward end of plate 282, for example lever arm 293, is extended inwardly from its pintle 303 to a point above the longitudinal center line of the bed frame structure 32 where it is connected to the end of a reciprocable rod 306 of a linear actuator 308. The body of this arm actuator is anchored on the mode control plate 282. Reciprocation of the rod 306 in either direction from its neutral position causes the interconnected lever arms and control valve bodies to be moved correspondingly in unison. Since the valve spools of the control valves 280 are independently connected by push-pull cable means 310 to the steering arms 274 on the wheels, they do not initially move with the valve bodies. Their movement is dependent upon movement of the steering arms so that when a steering movement is initiated, the spools are relatively displaced from their closed center position. Hydraulic fluid under pressure then flows through the valves to the steering cylinders 276 and continues to flow until the wheels are turned sufficiently to cause the feedback push-pull cable 310 to reposition the valve spools back to their closed center positions in the valve bodies.

Figure 17:
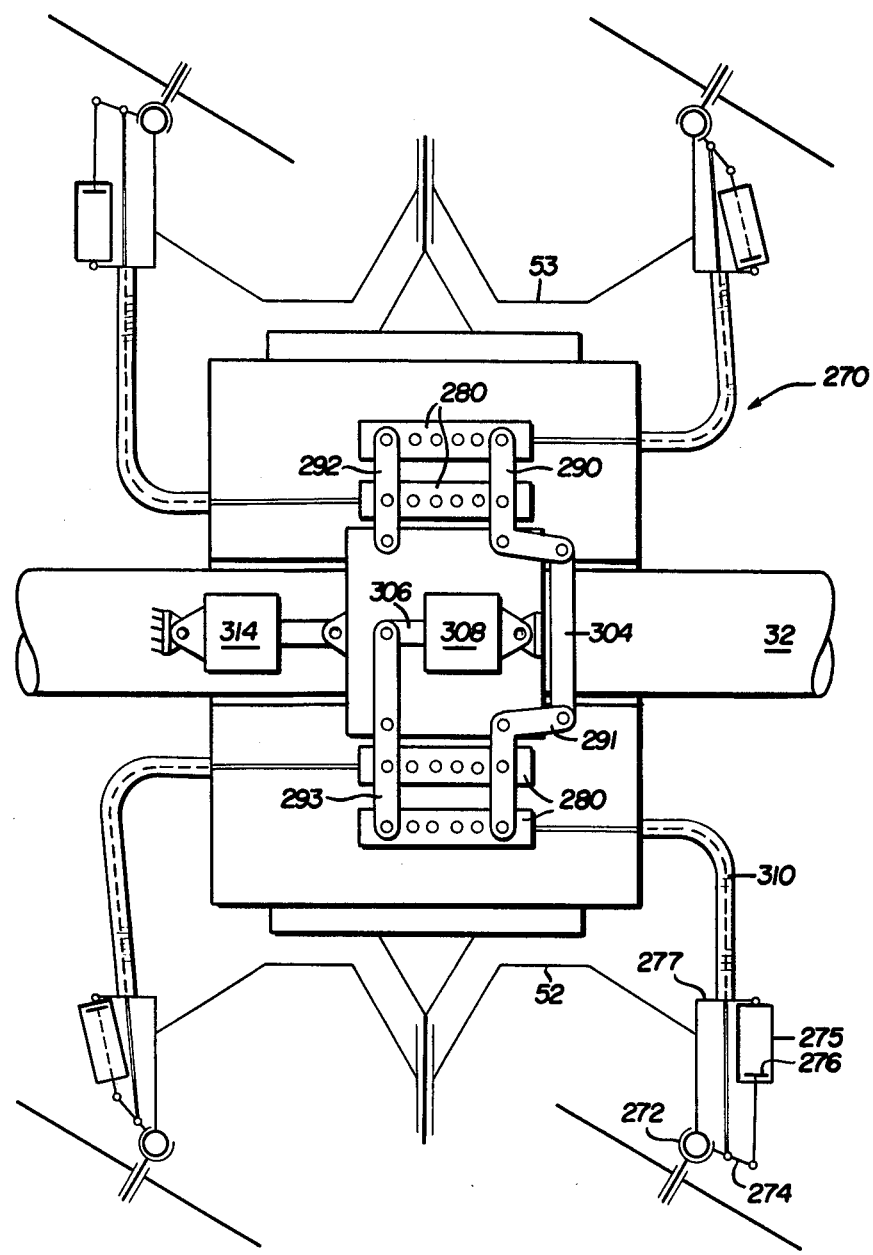
FIG. 17 is a view similar to FIG. 15 but with the mode control and wheels in the extreme right oblique position.
Figure 18:
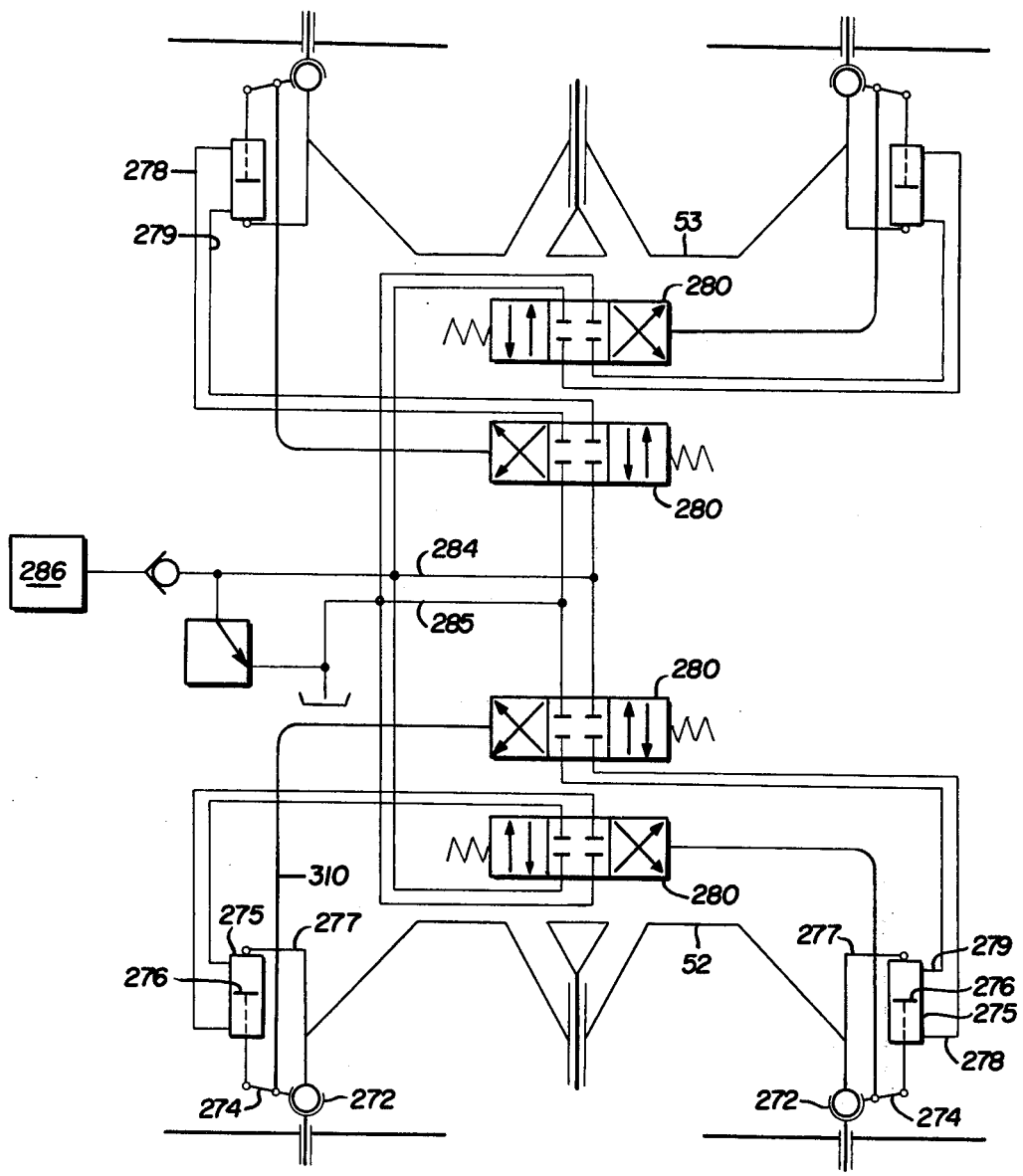
FIG. 18 is a partially schematic plan view of the rear quad wheel assembly of FIG. 15 illustrating the hydraulic portion of the steering subsystem.

The oblique travel steering capability is simply accomplished by shiftably mounting the mode control plate 282 on a pair of parallel track members 312 extending along the sides of the bed frame structure. A linear actuator 314 mounted on the bed frame structure 32 is used to position the mode control plate at a location along the track members which corresponds to the desired oblique travel angle. In FIG. 17 the mode control plate 282 is positioned in the maximum right oblique position. Under normal conditions the mode control plate is centered between the rearward or right oblique position as shown in the drawings and a forward or left oblique position. By cycling the plate from one extreme position to the other while simultaneously causing the vehicle to travel back and forth, the vehicle can be displaced laterally. These oblique and lateral movements are particularly important when the vehicle is traversing an area where the ground loses its support strength after being traversed by a limited number of loaded wheels. In the oblique travel mode the rear wheels travel over fresh areas alongside the travel path of the preceding wheel.

While this invention has been described with reference to a forwarding vehicle for transporting substantially full-length cut trees, it is to be understood that the vehicle chassis can be used for many other purposes, particularly where superior off-road mobility is a requisite. Accordingly, it is intended that the scope of the invention is to be limited primarily by the appended claims.

I claim:

1. For use in a self-propelled off-road vehicle having an elongated main frame element extending the length of the vehicle and at least one casing containing power transmission elements secured to said main frame element in depending relationship thereto, the improvement comprising a high mobility mounting mechanism for four wheels separately driven from said tranmission elements consisting of:

(1) a rigid support frame formed with a central aperture therein surrounding said transmission case and having opposed laterally projecting arm portions; means for pivotally mounting the central portion of said support frame to said main frame in depending relationship thereto for movement about a horizontal roll axis that is parallel to and below said main frame, whereby said arm portions of the support frame are freely movable concurrently but oppositely in a transverse vertical plane relative to said main frame member;

(2) a pair of walking beams respectively having their medial portions pivotally secured to said arm portions of said rigid frame for movements in vertical planes respectively parallel to said roll axis;

(3) a ground engaging wheel both steerably and rotatably mounted on each end of each walking beam member; and (4) power transmission means continuously interconnecting each said wheel with said power transmission elements contained in said casing.

2. The improvements defined in claim 1 plus a second casing containing power transmission elements connected to said main frame member in depending relationship and longitudinally spaced from said first casing, a second four-wheel mounting mechanism secured to said frame member in surrounding relationship to said second transmission casing, a pair of torque tubes respectively projecting forwardly and rearwardly from the two wheel mounting mechanisms and being respectively rigidly secured to the two support frame structures in coaxial alignment with said roll axis, and differential gear means respectively interconnecting the adjacent ends of said torque tubes and said main frame member to shift said main frame member about said roll axis in proportion to any difference in rotation of said torque about said roll axis, whereby said main frame member occupies a position relative to said roll axis that is intermediate the positions of said first and second support frame structures.

3. The improvements defined in claim 2 wherein two rotating power transmitting shafts interconnect said power transmission elements of said first and second casings and are respectively disposed within said torque tubes.

4. The improvements defined in claim 2 plus a power extensible link interconnecting said differential gear means and said main frame element to selectively control the steady state position of said main frame element about said roll axis.

5. A vehicle according to claim 1 wherein said walking beams each have a "W" shaped configuration in a horizontal plane.

* * * * *